Nov. 7, 1939.  F. S. STICKNEY ET AL  2,179,305
ADJUSTABLE MAGNETIC SHUNT FOR MEASURING INSTRUMENTS
Filed June 24, 1938
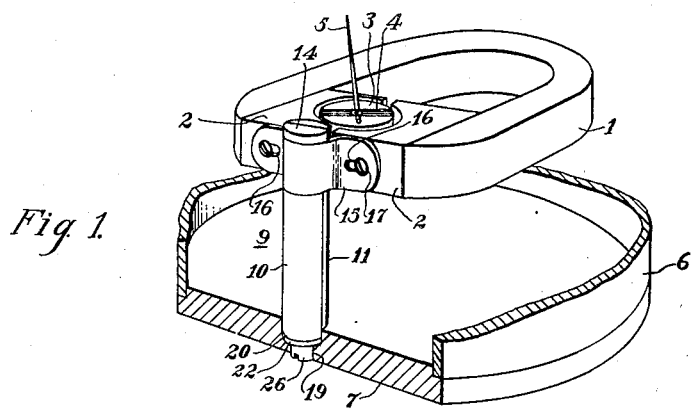
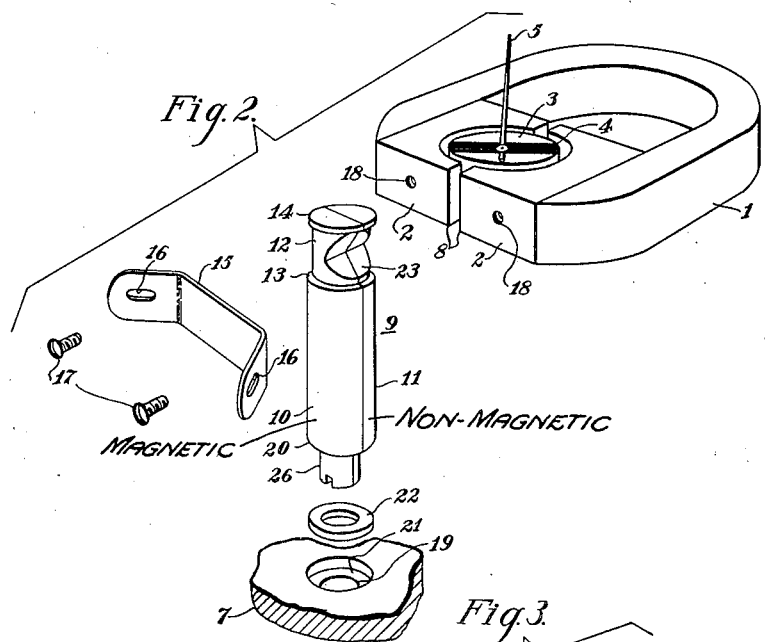
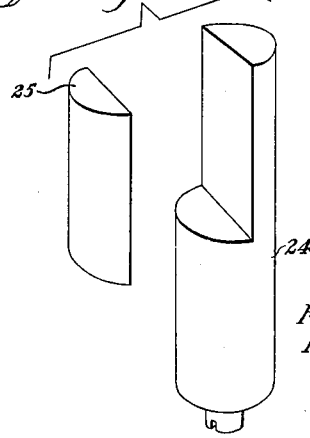
WITNESSES:
INVENTORS
Fernald S. Stickney &
Henry L. Bernarde.
BY
ATTORNEY Patented Nov. 7, 1939

2,179,305

UNITED STATES PATENT OFFICE 2,179,305

ADJUSTABLE MAGNETIC SHUNT FOR MEASURING INSTRUMENTS

Fernald S. Stickney, Verona, and Henry L. Bernarde, Union, N. J., assignors to Westinghouse Electric & Manufacturing Company, East Pittsburgh, Pa., a corporation of Pennsylvania Application June 24, 1938, Serial No. 215,634

11 Claims. (Cl. 171—95)

This invention relates to a calibrating adjustment, and it has particular relation to calibrating adjustments suitable for instruments of the D'Arsonval type.

Unless tolerances are maintained at impractical small values during the manufacturing of electrical instruments, a number of discrepancies can vary their calibration. Variations in magnetic properties of the instruments and variations in dimensions combine to provide errors which require an adjustment if the instruments are to have a standard scale. Furthermore, the service for which these instruments are designed also may affect their calibration. For example, a D'Arsonval instrument calibrated for use on an insulating panel would read low if mounted on a steel panel for the reason that the steel would weaken the flux passing through the air gap of the instrument. Ordinarily a special instrument would be provided for mounting on a steel panel.

In order to obviate these difficulties, we have developed a simple and efficient calibrator for instruments employing a magnetic circuit. This calibrator comprises a magnetic element which may be moved into the magnetic circuit of an instrument to vary the effective flux therein.

It is accordingly an object of our invention to provide a simple and efficient magnetic calibrating device for magnetic circuits.

It is another object of our invention to provide an eccentrically mounted magnetic shunt for a magnetic circuit which may be rotated into positions of different effectiveness.

It is still another object of our invention to provide an adjustable magnetic shunt shaped for facilitating fine adjustments thereof.

It is a further object of our invention to provide a magnetic calibrating device for a cased instrument which may be operated from the exterior of the casing.

Other objects will be apparent from the following description taken in conjunction with the accompanying drawing, in which:

Figure 1 is a view in perspective with parts in section of an instrument embodying our invention;

Fig. 2 is an exploded view in perspective of the instrument shown in Fig. 1; and Fig. 3 is an exploded view in perspective of a calibrating device of modified construction.

Referring to the drawing, Fig. 1 shows an instrument of the D'Arsonval type comprising a permanent magnet 1 having a pair of pole pieces 2, between which is positioned a magnetic core 3. In the gap between the pole pieces 2 and the magnetic core 3, a coil 4 is positioned for rotation on bearings (not shown). As is customary in this type of instrument, a current is passed through the coil, and this reacts with the magnetic flux in the air gap to rotate the coil against the resistance of a spring (not shown), a pointer 5 being moved by the coil to indicate the amplitude of movement. Customarily, a scale is associated with the pointer for indicating readily the movement thereof. The instrument thus far described is mounted in a casing 6 having a base 7, as shown in Fig. 1.

In order to calibrate this instrument, we place against the edges 8 of the pole pieces a calibrating device 9. This calibrating device comprises a magnetic strip 10 and a non-magnetic strip 11, which conveniently may be formed of low carbon steel and brass, respectively. These strips may be united in any convenient manner as by soldering, welding or screws. Adjacent one end, this calibrating device is provided with a reduced cylindrical bearing portion 12 bordered by two shoulders 13 and 14. The bearing portion 12 permits the device to be rotated while in contact with the edges 8, and the shoulders 13 and 14 restrict axial movement of the calibrating device. A leaf spring 15, preferably of brass, bronze or other suitable non-magnetic material, is provided for biasing the calibrating device against the edges 8, and for frictionally holding the device in any position into which it is rotated. The leaf spring may take many forms, but as shown, it is provided with two elongated slots 16, one adjacent each end of the spring through which machine screws 17 are passed and screwed into tapped openings 18 provided in the pole pieces 2. Preferably, the spring is of such width that it will be received between the shoulders 13 and 14 of the calibrating device. For rotating the calibrating device conveniently from the exterior of the casing, I provide the calibrating device with an elongated shank sufficient to reach the base 7 and a reduced cylindrical portion 26 which extends through an opening 19 provided in the casing. The portion 26 may have a screw driver slot formed therein or may be otherwise constructed to facilitate rotation of the device 9. In order to seal the casing against the entrance of dust and other foreign matter, the calibrating device 9 and the base 7 may be provided with shoulders 20 and 21, between which a gasket 22 of cork, felt or other suitable material is placed for sealing purposes.

It is believed that the operation of the calibrating device is apparent from the foregoing description. When the calibrating device is in the position shown in Fig. 1, the magnetic strip 10 is spaced from the pole pieces 2 by means of the non-magnetic strip 11, and has little effect on the flux distribution in the pole pieces. When the calibrating device is rotated, an increasing amount of magnetic material is introduced between the edges 8 of the pole pieces 2 and provides a gradually increasing magnetic shunt across the pole pieces. By regulating the rotation of the calibrating device, any desired shunting effect may be produced.

Although the calibrating device thus far described is operative, it provides a rather abrupt variation upon rotation, because of the introduction of magnetic material over the entire width of the pole pieces 2. In order to provide a more gradual calibration, we prefer to modify the shape of the magnetic shunt as by forming a notch 23 therein. Preferably, this notch is terminated short of the shoulders 13 and 14 to provide narrow continuous bearing portions for the calibrating device. Because of this notch, the introduction of magnetic material into the space between the pole pieces 2 will be gradual and will provide a sensitive adjustment satisfactory for general use. The particular shape of the notch is subject to variation, the main requisite being that the magnetic material be provided with an edge inclined with reference to one of the edges 8 of the pole pieces in order to effect a gradual introduction of magnetic material between the pole pieces. Although the notch is shown to be formed both in the magnetic and non-magnetic pieces 10 and 11, it is necessary only in the magnetic member 10, and is continued into the non-magnetic strip only for convenience in manufacture.

In Fig. 3, we have illustrated a modified construction for the calibrating device which restricts the magnetic material to the bearing portion adjacent the pole pieces 2. As shown in Fig. 3, the major portion 24 of the calibrating device is formed of a suitable non-magnetic material, such as brass. Adjacent the end which is to be positioned against the pole pieces 2, we inlay by soldering, welding or otherwise a strip of magnetic material 25, such as low carbon steel. This strip is of such length that a bearing and shoulder similar to the bearing 12 and shoulder 14 of Fig. 2 may be machined therein. Such a construction has the advantage that the magnetic material is restricted to the portion of the calibrating device which is effective in shunting the flux passing through the air gap. If desired however, the major portion 24 may be magnetic and the inlay 25 brass.

Although we have described our invention with reference to certain specific embodiments thereof, it is obvious that many modifications are possible. The principal desideratum of the calibrating device is that a portion of the magnetic material be eccentrically or otherwise mounted with reference to the axis of the calibrating device, so that it may be rotated or moved into and out of operative relation relative to the pole pieces of the magnet to be adjusted. The magnetic material preferably should be so formed that its rotation into operative position effects a gradual variation in the distribution of flux or shunting of flux in the gap of the magnet. Although we have illustrated the shunt as applied to a permanent magnet instrument, it is clear that the shunt may be employed for adjusting the magnetic circuit of an electromagnet in a similar manner.

Since this shunt ordinarily will be employed only occasionally for adjustment purposes, we have illustrated the shunt control as extending through the base of the instrument. This has the advantage that the space adjacent the pointer of the instrument is left free for the spring assembly and other calibrating mechanism.

Since our invention is susceptible to numerous variations, we do not wish to be restricted to the specific embodiments illustrated and described. Our invention, therefore, is to be restricted only by the appended claims as interpreted in view of the prior art.

We claim as our invention:

1. In an adjustment device, a member having a bearing portion, and a magnetic portion eccentrically supported with reference to said bearing portion, said magnetic portion having an edge inclined at an acute angle relative to the axis of said bearing portion.

2. In an adjustment device, a composite cylindrical member comprising a plurality of radial sections differing in permeability, said member having a notch formed therein for providing an edge on a section of higher permeability which is inclined at an acute angle relative to the axis of said member.

3. In an instrument, a magnet having an air gap, an adjusting device having a magnetic section for controlling the distribution of magnetic flux in said air gap and having a cylindrical portion bridging said air gap and abutting opposed pole pieces of said magnet, said device having a shoulder adjacent each end of said cylindrical portion, a non-magnetic leaf spring positioned between said shoulders and attached to said magnet for urging said device toward said magnet, and a casing for said magnet, said device having a portion extending towards said casing and being accessible therethrough.

4. In a measuring instrument, a magnetic structure having an air gap, a coil mounted in said air gap for rotation relative to said magnetic structure, and an adjustable magnetic shunt device mounted for rotation adjacent said air gap about an axis parallel to the axis of rotation of said coil, said shunt device having a magnetic segment rotatable into and out of effective magnetic bridging relationship across said air gap as said shunt device is rotated.

5. In a measuring instrument, a magnetic structure having an air gap and including a permanent magnet for passing magnetic flux through said air gap, a coil mounted in said air gap for rotation relative to said magnetic structure, and an adjustable magnetic shunt device mounted in contact with a pair of opposed pole portions of said magnetic structure bordering said air gap for rotation about an axis parallel to the axis of rotation of said coil, said shunt device having a magnetic segment rotatable into and out of effective magnetic bridging relationship across said air gap as said shunt device is rotated.

6. In a measuring instrument, a magnetic structure having an air gap and including a permanent magnet for passing magnetic flux through said air gap, a coil mounted in said air gap for rotation relative to said magnetic structure, an adjustable magnetic shunt device mounted for rotation about an axis parallel to the axis of rotation of said coil, a spring for biasing said shunt device towards opposed pole portions of said magnetic structure bordering said air gap, a pointer assembly positioned on a first side of said magnetic structure for actuation by said coil, and an element extending from said shunt device on a second side of said magnetic structure for adjusting said shunt device, said shunt device having a magnetic segment rotatable into and out of effective magnetic bridging relationship across said air gap as said shunt device is rotated.

7. In a measuring instrument, a magnetic structure having an air gap, a coil mounted in said air gap for rotation relative to said magnetic structure, and an adjustable magnetic shunt device mounted for rotation adjacent said air gap about an axis parallel to the axis of rotation of said coil, said shunt device including a cylindrical element having a diameter larger than a corresponding dimension of said air gap, means for biasing said shunt device towards edges of a pair of opposed pole portions of said magnetic structure bordering said air gap, said cylindrical element including a non-magnetic radial segment and a magnetic radial segment movable into and out of effective bridging relationship across said air gap as said shunt device is rotated.

8. In a measuring instrument, a magnetic structure having an air gap, a coil mounted in said air gap for rotation relative to said magnetic structure, a magnetic shunt element rotatable about an axis parallel to the axis of rotation of said coil into and out of effective magnetic bridging relationship across a pair of opposed edges of pole portions of said magnetic structure bordering said air gap, said magnetic shunt element having an edge inclined at an acute angle relative to one of said opposed edges for introducing said magnetic shunt element gradually into bridging relationship as it is rotated.

9. In a measuring instrument, a magnetic structure having an air gap, a coil mounted in said air gap for rotation relative to said magnetic structure, and an adjustable magnetic shunt device mounted for rotation adjacent said air gap about an axis parallel to the axis of rotation of said coil, said shunt device including a cylindrical element having a diameter larger than a corresponding dimension of said air gap, means for biasing said shunt device towards edges of a pair of opposed pole portions of said magnetic structure bordering said air gap, said cylindrical element including a non-magnetic radial segment and a magnetic radial segment having an edge inclined at an acute angle relative to one of said pole portion edges for gradually introducing said magnetic radial segment into and out of effective bridging relationship across said air gap as said shunt device is rotated.

10. In a measuring instrument, a magnetic structure having an air gap, a coil mounted in said air gap for rotation relative to said magnetic structure, and an adjustable magnetic shunt device mounted for rotation adjacent said air gap into and out of effective bridging relationship across said air gap, and a casing for enclosing said measuring instrument, said adjustable magnetic shunt device being adjustable from the exterior of said casing.

11. In a measuring instrument, a magnetic structure having an air gap and including a permanent magnet for passing magnetic flux through said air gap, a coil mounted in said air gap for rotation relative to said magnetic structure, a casing for enclosing said magnetic structure and coil, and a rotatable member extending from a position adjacent said air gap to said casing and rotatable from the exterior of said casing, said rotatable member including a magnetic shunt portion movable into and out of effective magnetic bridging relationship across said air gap as said member is rotated.

HENRY L. BERNARDE.
FERNALD S. STICKNEY.